United States Patent
Grajcar (10) Patent No.: US 10,772,172 B2
(45) Date of Patent: Sep. 8, 2020

(54) SYSTEM AND METHOD OF ILLUMINATING LIVESTOCK

(71) Applicant: SIGNIFY NORTH AMERICA CORPORATION, Somerset, NJ (US)

(72) Inventor: Zdenko Grajcar, Orono, MN (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 447 days.

(21) Appl. No.: 15/472,554

(22) Filed: Mar. 29, 2017

(65) Prior Publication Data

US 2017/0290124 A1 Oct. 5, 2017

Related U.S. Application Data

(60) Provisional application No. 62/314,692, filed on Mar. 29, 2016.

(51) Int. Cl.
*A01K 15/00* (2006.01)
*H05B 45/20* (2020.01)
(Continued)

(52) U.S. Cl.
CPC ............ *H05B 45/20* (2020.01); *A01K 15/00* (2013.01); *F21S 10/023* (2013.01); *H05B 45/10* (2020.01);
(Continued)

(58) Field of Classification Search
CPC ........ A01K 29/00; A01K 15/00; A01K 15/02; A01K 2227/108; A01K 15/027
See application file for complete search history.

(56) References Cited

U.S. PATENT DOCUMENTS 4,239,020 A 12/1980 Kiyokawa et al.
4,271,788 A 6/1981 Knowles
(Continued)

FOREIGN PATENT DOCUMENTS

CH 662244 A5 9/1987
CN 101162847 A 4/2008
(Continued)

OTHER PUBLICATIONS

"U.S. Appl. No. 16/271,948, Non Final Office Action dated May 21, 2019", 7 pgs.
(Continued)

*Primary Examiner* — Kristen C Hayes (57) ABSTRACT

A control system for illuminating swine having one or more controllers configured to increase voltage supplied to a first plurality of lights to a first threshold voltage to illuminate the first plurality of lights to provide a first light having a first color characteristic that affects swine. The one or more controllers are also configured to increase the voltage supplied to a second plurality of lights to a second threshold voltage to illuminate the second plurality of lights to provide a second light with a second color characteristic different than the first color characteristic. The one or more controllers are also configured to increase the voltage supplied to a third plurality of lights to a third threshold voltage to illuminate the third plurality of lights to provide third light with a third color characteristic that stimulates the swine to have a predetermined behavior.

12 Claims, 7 Drawing Sheets

(51) Int. Cl.
*F21S 10/02* (2006.01)
*H05B 45/10* (2020.01)
*H05B 47/16* (2020.01)
*F21V 29/77* (2015.01)
*F21Y 115/10* (2016.01)
*F21V 3/00* (2015.01)
*F21V 23/00* (2015.01)
*F21V 31/00* (2006.01)

(52) U.S. Cl.
CPC ............... *H05B 47/16* (2020.01); *F21V 3/00* (2013.01); *F21V 23/001* (2013.01); *F21V 29/77* (2015.01); *F21V 31/005* (2013.01); *F21Y 2115/10* (2016.08); *Y02B 20/42* (2013.01)

(56) References Cited

U.S. PATENT DOCUMENTS

| | | | |
|---|---|---|---|
| 4,625,728 A | 12/1986 | Schonberg | |
| 4,700,887 A | 10/1987 | Timmons | |
| 4,721,062 A | 1/1988 | Williams et al. | |
| 4,872,421 A | 10/1989 | Laurent et al. | |
| 4,939,426 A | 7/1990 | Menard et al. | |
| 5,036,797 A | 8/1991 | Koozer | |
| 5,108,907 A | 4/1992 | Pleass | |
| 5,188,907 A | 2/1993 | Kawahara et al. | |
| 5,482,210 A | 1/1996 | Carey et al. | |
| 5,495,147 A | 2/1996 | Lanzisera | |
| 5,575,459 A | 11/1996 | Anderson | |
| 5,602,709 A | 2/1997 | Al-Dabbagh | |
| 5,900,929 A | 5/1999 | Hebrank et al. | |
| 6,016,038 A | 1/2000 | Mueller et al. | |
| 6,116,190 A | 9/2000 | Kitt | |
| 6,166,496 A | 12/2000 | Lys et al. | |
| 6,224,243 B1 | 5/2001 | Karton | |
| 6,236,622 B1 | 5/2001 | Blackman | |
| 6,252,254 B1 | 6/2001 | Soules et al. | |
| 6,357,889 B1 | 3/2002 | Duggal et al. | |
| 6,461,019 B1 | 10/2002 | Allen | |
| 6,573,254 B1 | 6/2003 | Kuenzel et al. | |
| 6,636,003 B2 | 10/2003 | Rahm et al. | |
| 6,766,767 B2 | 7/2004 | El Halawani et al. | |
| 6,789,500 B2 | 9/2004 | Rozenboim | |
| 6,810,832 B2 | 11/2004 | Ford | |
| 6,933,707 B2 | 8/2005 | Allen | |
| 6,953,266 B1 | 10/2005 | VerHage et al. | |
| 7,038,399 B2 | 5/2006 | Lys et al. | |
| 7,081,722 B1 | 7/2006 | Huynh | |
| 7,102,334 B2 | 9/2006 | Wiegand et al. | |
| 7,102,344 B1 | 9/2006 | Short et al. | |
| 7,131,397 B2 | 11/2006 | El Halawani et al. | |
| 7,213,942 B2 | 5/2007 | Jiang | |
| 7,220,018 B2 | 5/2007 | Crabb et al. | |
| 7,288,902 B1 | 10/2007 | Melanson | |
| 7,352,138 B2 | 4/2008 | Lys et al. | |
| 7,358,679 B2 | 4/2008 | Lys et al. | |
| 7,378,805 B2 | 5/2008 | Oh et al. | |
| 7,391,630 B2 | 6/2008 | Acatrnei | |
| 7,425,801 B2 | 9/2008 | Ozaki | |
| 7,436,134 B2 | 10/2008 | Levine | |
| 7,489,086 B2 | 2/2009 | Miskin et al. | |
| 7,709,774 B2 | 5/2010 | Schulz et al. | |
| 7,723,926 B2 | 5/2010 | Mednik et al. | |
| 7,781,979 B2 | 8/2010 | Lys | |
| 7,791,289 B2 | 9/2010 | Oosterbaan et al. | |
| 7,847,486 B2 | 12/2010 | Ng | |
| 7,847,496 B2 | 12/2010 | Bui et al. | |
| 7,859,196 B2 | 12/2010 | Lee et al. | |
| 7,863,831 B2 | 1/2011 | Vos | |
| 7,880,400 B2 | 2/2011 | Zhou et al. | |
| 7,902,769 B2 | 3/2011 | Shteynberg et al. | |
| 7,936,135 B2 | 5/2011 | Hum et al. | |
| 7,977,892 B2 | 7/2011 | Lee et al. | |
| 8,102,167 B2 | 1/2012 | Irissou et al. | |
| 8,120,279 B2 | 2/2012 | Oosterbaan et al. | |
| 8,134,303 B2 | 3/2012 | Lys | |
| 8,159,125 B2 | 4/2012 | Miao | |
| 8,164,276 B2 | 4/2012 | Kuwabara | |
| 8,188,679 B2 | 5/2012 | Hoogzaad | |
| 8,188,687 B2 | 5/2012 | Lee et al. | |
| 2,465,329 A1 | 6/2012 | Zdenko | |
| 8,205,577 B2 | 6/2012 | Sia et al. | |
| 8,324,642 B2 | 12/2012 | Grajcar | |
| 8,324,840 B2 | 12/2012 | Shteynberg et al. | |
| 8,373,363 B2 | 2/2013 | Grajcar | |
| 8,384,307 B2 | 2/2013 | Grajcar | |
| 8,468,976 B2 | 6/2013 | Kakimi et al. | |
| 8,531,136 B2 | 9/2013 | Grajcar | |
| 8,593,044 B2 | 11/2013 | Grajcar | |
| 8,596,804 B2 | 12/2013 | Grajcar | |
| 8,598,799 B2 | 12/2013 | Tai et al. | |
| 8,643,308 B2 | 2/2014 | Grajcar | |
| 8,657,463 B2 * | 2/2014 | Lichten | F21S 8/063 362/231 |
| 8,736,194 B2 | 5/2014 | Kawai et al. | |
| 8,773,031 B2 | 7/2014 | Sadwick et al. | |
| 8,796,955 B2 | 8/2014 | Grajcar | |
| 8,858,005 B2 | 10/2014 | Grajcar | |
| 8,876,313 B2 * | 11/2014 | Grajcar | F21S 8/006 362/84 |
| 8,907,576 B2 | 12/2014 | Ferrier | |
| 8,922,136 B2 | 12/2014 | Grajcar | |
| 9,155,151 B2 | 10/2015 | Angles | |
| 9,210,755 B2 | 12/2015 | Grajcar | |
| 9,247,603 B2 | 1/2016 | Grajcar et al. | |
| 9,374,858 B2 | 6/2016 | Ni | |
| 9,433,046 B2 | 8/2016 | Grajcar | |
| 9,482,397 B2 * | 11/2016 | Grajcar | F21S 8/006 |
| 9,700,019 B2 * | 7/2017 | Grajcar | A01K 29/00 |
| 9,709,228 B2 | 7/2017 | Grajcar | |
| 9,756,837 B2 * | 9/2017 | Grajcar | A01K 31/005 |
| 9,844,210 B2 * | 12/2017 | Grajcar | A01K 45/007 |
| 10,104,875 B2 * | 10/2018 | Grajcar | A01K 45/007 |
| 10,182,557 B2 * | 1/2019 | Suntych | A01K 45/00 |
| 10,206,378 B2 * | 2/2019 | Grajcar | A01K 67/02 |
| 10,212,892 B2 * | 2/2019 | Grajcar | A01G 7/045 |
| 10,237,956 B2 * | 3/2019 | Grajcar | H05B 33/0824 |
| 2002/0003233 A1 | 1/2002 | Mueller-Mach et al. | |
| 2002/0047606 A1 | 4/2002 | Guthrie et al. | |
| 2002/0097007 A1 | 7/2002 | Koncz et al. | |
| 2002/0149929 A1 | 10/2002 | Evans et al. | |
| 2003/0164809 A1 | 9/2003 | Leung | |
| 2003/0172878 A1 | 9/2003 | Halawani et al. | |
| 2005/0212458 A1 | 9/2005 | Powers, Jr. et al. | |
| 2005/0241593 A1 | 11/2005 | Kaura | |
| 2005/0256554 A1 | 11/2005 | Malak | |
| 2005/0276720 A1 | 12/2005 | Correa | |
| 2005/0280964 A1 | 12/2005 | Richmond et al. | |
| 2007/0086912 A1 | 4/2007 | Dowling et al. | |
| 2007/0182338 A1 | 8/2007 | Shteynberg et al. | |
| 2007/0258240 A1 | 11/2007 | Ducharme et al. | |
| 2008/0012722 A1 | 1/2008 | Moseley et al. | |
| 2008/0017120 A1 | 1/2008 | Hawk | |
| 2008/0042588 A1 | 2/2008 | Chan et al. | |
| 2008/0116816 A1 | 5/2008 | Neuman et al. | |
| 2008/0174233 A1 | 7/2008 | Bawendi et al. | |
| 2008/0178819 A1 | 7/2008 | Sia et al. | |
| 2008/0198009 A1 | 8/2008 | Hoeben et al. | |
| 2008/0202443 A1 | 8/2008 | Potter | |
| 2008/0203936 A1 | 8/2008 | Mariyama et al. | |
| 2008/0211421 A1 | 9/2008 | Lee et al. | |
| 2008/0218995 A1 | 9/2008 | Gilkey et al. | |
| 2009/0096739 A1 | 4/2009 | Lan et al. | |
| 2009/0160370 A1 | 6/2009 | Tai et al. | |
| 2009/0185373 A1 | 7/2009 | Grajcar | |
| 2009/0262515 A1 | 10/2009 | Lee et al. | |
| 2009/0267534 A1 | 10/2009 | Godbole et al. | |
| 2010/0013402 A1 | 1/2010 | Chaffai et al. | |
| 2010/0060175 A1 | 3/2010 | Lethellier | |
| 2010/0072903 A1 | 3/2010 | Blaut et al. | |
| 2010/0164579 A1 | 7/2010 | Acatrinei | |
| 2010/0165677 A1 | 7/2010 | Wang et al. | |
| 2010/0225241 A1 | 9/2010 | Maehara et al. | |

(56) References Cited

U.S. PATENT DOCUMENTS

| | | |
|---|---|---|
| 2010/0237800 A1 | 9/2010 | Kang et al. |
| 2010/0294205 A1 | 11/2010 | Kakimi et al. |
| 2010/0308739 A1 | 12/2010 | Shteynberg et al. |
| 2010/0308751 A1 | 12/2010 | Nerone |
| 2010/0310552 A1 | 12/2010 | Rapp et al. |
| 2010/0315012 A1 | 12/2010 | Kim et al. |
| 2011/0018465 A1 | 1/2011 | Ashdown |
| 2011/0031888 A1 | 2/2011 | Datta et al. |
| 2011/0031890 A1 | 2/2011 | Stack et al. |
| 2011/0037415 A1 | 2/2011 | Juestel et al. |
| 2011/0084619 A1 | 4/2011 | Gray |
| 2011/0088314 A1 | 4/2011 | Jacobs |
| 2011/0101883 A1* | 5/2011 | Grajcar ............... A01K 29/00 315/291 |
| 2011/0109244 A1 | 5/2011 | Grajcar |
| 2011/0163680 A1 | 7/2011 | Welten |
| 2011/0183368 A1 | 7/2011 | Chapman et al. |
| 2011/0210678 A1 | 9/2011 | Grajcar |
| 2011/0227490 A1 | 9/2011 | Huynh |
| 2011/0228515 A1 | 9/2011 | Grajcar |
| 2011/0273103 A1 | 11/2011 | Hong |
| 2012/0001558 A1 | 1/2012 | Vos |
| 2012/0002408 A1* | 1/2012 | Lichten ................ F21S 8/063 362/218 |
| 2012/0025709 A1 | 2/2012 | Zampini et al. |
| 2012/0081009 A1 | 4/2012 | Shteynberg et al. |
| 2012/0081018 A1 | 4/2012 | Shteynberg et al. |
| 2012/0104977 A1 | 5/2012 | Mckenzie et al. |
| 2012/0153833 A1 | 6/2012 | Mikani et al. |
| 2012/0186524 A1* | 7/2012 | Grajcar ............... A01K 31/005 119/6.8 |
| 2012/0200229 A1 | 8/2012 | Kunst et al. |
| 2012/0223649 A1 | 9/2012 | Saes et al. |
| 2012/0268918 A1 | 10/2012 | Grajcar |
| 2012/0299500 A1 | 11/2012 | Sadwick et al. |
| 2013/0016506 A1 | 1/2013 | Odom, Jr. |
| 2013/0069536 A1 | 3/2013 | Ni |
| 2013/0069546 A1 | 3/2013 | Lin et al. |
| 2013/0127356 A1 | 5/2013 | Tanaka et al. |
| 2013/0134888 A1 | 5/2013 | Grajcar |
| 2013/0153938 A1 | 6/2013 | Grajcar |
| 2013/0157394 A1 | 6/2013 | Gr |
| 2013/0169159 A1 | 7/2013 | Lys |
| 2013/0187572 A1 | 7/2013 | Grajcar |
| 2013/0193864 A1 | 8/2013 | Angeles |
| 2013/0200812 A1 | 8/2013 | Radermacher et al. |
| 2013/0207555 A1 | 8/2013 | Qiu et al. |
| 2013/0234622 A1 | 9/2013 | Tanaka et al. |
| 2013/0342120 A1 | 12/2013 | Creusen et al. |
| 2014/0098531 A1 | 4/2014 | Grajcar |
| 2014/0103823 A1 | 4/2014 | Kahman et al. |
| 2014/0111091 A1 | 4/2014 | Grajcar et al. |
| 2014/0126174 A1 | 5/2014 | Grajcar |
| 2014/0159584 A1 | 6/2014 | Grajcar |
| 2014/0159615 A1* | 6/2014 | Grajcar ............... F21S 8/006 315/307 |
| 2014/0197741 A1 | 7/2014 | Sakai et al. |
| 2014/0197751 A1 | 7/2014 | Grajcar |
| 2014/0210352 A1 | 7/2014 | Grajcar |
| 2014/0210357 A1 | 7/2014 | Yan et al. |
| 2014/0252340 A1 | 9/2014 | Wang |
| 2015/0061534 A1 | 3/2015 | Grajcar |
| 2015/0069932 A1 | 3/2015 | Grajcar |
| 2015/0115845 A1* | 4/2015 | Grajcar ............... A01K 31/00 315/360 |
| 2015/0136037 A1 | 5/2015 | Boonekamp et al. |
| 2015/0204497 A1* | 7/2015 | Grajcar ............... F21S 8/006 362/2 |
| 2015/0230309 A1* | 8/2015 | Grajcar ............. H05B 33/0845 315/192 |
| 2015/0237696 A1 | 8/2015 | Shackle |
| 2015/0247631 A1 | 9/2015 | Grajcar et al. |
| 2015/0273235 A1 | 10/2015 | Grajcar |
| 2016/0113079 A1 | 4/2016 | Hiramatu et al. |
| 2016/0165698 A1 | 6/2016 | Grajcar |
| 2016/0212817 A1 | 7/2016 | Grajcar et al. |
| 2016/0316727 A1 | 11/2016 | Grajcar et al. |
| 2016/0323960 A1 | 11/2016 | Grajcar |
| 2017/0000163 A1 | 1/2017 | Grajcar |
| 2017/0064781 A1 | 3/2017 | Haskvitz |
| 2017/0105391 A1 | 4/2017 | Grajcar |
| 2017/0259079 A1* | 9/2017 | Grajcar ............... A61N 5/0618 |
| 2017/0273281 A1* | 9/2017 | Grajcar ............... A01K 45/007 |
| 2019/0174604 A1 | 6/2019 | Grajcar |

FOREIGN PATENT DOCUMENTS

| | | |
|---|---|---|
| CN | 101672839 A | 3/2010 |
| CN | 102612791 A | 7/2012 |
| CN | 104106122 A | 10/2014 |
| CN | 205694943 U | 11/2016 |
| EP | 0064175 A1 | 11/1982 |
| EP | 0229583 A2 | 7/1987 |
| EP | 1502483 A1 | 2/2005 |
| EP | 2094063 A1 | 8/2009 |
| EP | 2465174 A1 | 2/2011 |
| EP | 2465329 A1 | 7/2012 |
| EP | 2666220 A2 | 7/2012 |
| EP | 2795654 A1 | 10/2014 |
| GB | 2522020 A | 7/2015 |
| JP | H05199823 A | 8/1993 |
| JP | 2004248333 A | 9/2004 |
| JP | 2005137238 A | 6/2005 |
| JP | 2006147933 A | 6/2006 |
| JP | 2006244848 A | 9/2006 |
| JP | 2007511903 A | 5/2007 |
| JP | 2007299788 A | 11/2007 |
| JP | 2008059811 A | 3/2008 |
| JP | 2008218043 A | 9/2008 |
| JP | 2009026544 A | 2/2009 |
| JP | 2009035673 A | 2/2009 |
| JP | 2009060069 A | 3/2009 |
| JP | 2009117036 A | 5/2009 |
| JP | 2009123427 A | 6/2009 |
| JP | 2009171866 A | 6/2009 |
| JP | 2011040701 A | 2/2011 |
| JP | 2014516452 A | 7/2014 |
| JP | 5676611 B2 | 1/2015 |
| KR | 20120112146 A | 10/2012 |
| WO | WO-1984000693 A1 | 3/1984 |
| WO | WO-0106630 A1 | 1/2001 |
| WO | WO-2001006630 A1 | 1/2001 |
| WO | WO-02061427 A1 | 8/2002 |
| WO | WO-2002061427 A1 | 8/2002 |
| WO | WO-2005084080 A2 | 9/2005 |
| WO | WO-2008114250 A1 | 9/2008 |
| WO | WO-2010037009 A1 | 4/2010 |
| WO | WO-2012100183 A2 | 7/2012 |
| WO | WO-2013044916 A1 | 4/2013 |
| WO | WO-2013100736 A1 | 7/2013 |
| WO | WO-2013169159 A1 | 11/2013 |
| WO | WO-2014047473 A1 | 3/2014 |
| WO | WO-2014052897 A1 | 4/2014 |
| WO | WO-2014200960 A1 | 12/2014 |
| WO | WO-2015002665 A1 | 1/2015 |
| WO | WO-2015017655 A1 * | 2/2015 |
| WO | WO-2015017655 A1 | 2/2015 |
| WO | WO-2015038720 A1 | 3/2015 |
| WO | WO-2015105776 A1 | 7/2015 |
| WO | WO-2015105823 A1 | 7/2015 |
| WO | WO-2015113818 A1 | 8/2015 |
| WO | WO-2016033002 A1 | 3/2016 |
| WO | WO-2017004318 A1 | 1/2017 |
| WO | WO-2017172869 A1 | 10/2017 |

OTHER PUBLICATIONS

"U.S. Appl. No. 14/906,685, Appeal Brief filed Oct. 5, 2017", 16 pgs.

"U.S. Appl. No. 14/906,685, Final Office Action dated Dec. 5, 2016", 8 pgs.

(56) References Cited

OTHER PUBLICATIONS

"U.S. Appl. No. 14/906,685, Non Final Office Action dated Jun. 14, 2016", 9 pgs.
"U.S. Appl. No. 14/906,685, Non Final Office Action dated Nov. 9, 2017", 8 pgs.
"U.S. Appl. No. 14/906,685, Preliminary Amendment filed Jan. 21, 2016", 3 pgs.
"U.S. Appl. No. 14/906,685, Response filed Nov. 11, 2016 to Non Final Office Action dated Jun. 14, 2016", 7 pgs.
"U.S. Appl. No. 15/108,690, Notice of Allowance dated Jan. 24, 2018", 9 pgs.
"Chinese Application Serial No. 201480047295.6, First Office Action dated Apr. 24, 2017.", w. English Translation, 12 pgs.
"Chinese Application Serial No. 201480047295.6, Second Office Action dated Sep. 26, 2017", w. English Translation, 11 pgs.
"European Application Serial No. 15734927.5, search report dated May 9, 2017", 8 pgs.
"International Application Serial No. PCT/US2014/049143, International Preliminary Report on Patentability dated Feb. 11, 2016", 6 pgs.
"International Application Serial No. PCT/US2014/049143, International Search Report dated Nov. 6, 2014", 2 pgs.
"International Application Serial No. PCT/US2014/049143, Written Opinion dated Nov. 6, 2014", 4 pgs.
"International Application Serial No. PCT/US2015/010407, International Preliminary Report on Patentability dated Jul. 21, 2016", 6 pgs.
"International Application Serial No. PCT/US2015/010407, International Search Report dated Apr. 7, 2015", 2 pgs.
"International Application Serial No. PCT/US2015/010407, Written Opinion dated Apr. 7, 2015", 4 pgs.
"International Application Serial No. PCT/US2017/024679, International Search Report dated Aug. 2, 2017", 4 pgs.
"International Application Serial No. PCT/US2017/024679, Invitation to Pay Additional Fees and Partial Search Report dated Jun. 7, 2017", 2 pgs.
"International Application Serial No. PCT/US2017/024679, Written Opinion dated Aug. 2, 2017", 5 pgs.
Claus, R, et al., "Influence of light and photoperiodicity on pig prolificacy", Journals of Reproduction & Fertility Ltd, (1985), 185-197.
Taylor, Nina, "Lighting for Pig Units", Report compiled for BPEX, [Online]. Retrieved from the Internet: <http://www.bpex.org.uk/media/39814/lighting-for-pig-units-final-report.pdf>, (Apr. 30, 2010), 1-74.
"U.S. Appl. No. 14/906,685, Corrected Notice of Allowability dated Feb. 13, 2019", 2 pgs.
"U.S. Appl. No. 14/906,685, Corrected Notice of Allowability dated Feb. 21, 2019", 2 pgs.
"U.S. Appl. No. 14/906,685, Notice of Allowance dated Jul. 13, 2018", 5 pgs.
"U.S. Appl. No. 14/906,685, Notice of Allowance dated Nov. 2, 2018", 5 pgs.
"U.S. Appl. No. 15/108,690, Notice of Allowance dated Sep. 26, 2018", 5 pgs.
"European Application No. EP10827580.1 Extended European_Search_Report_dated Feb. 5, 2016", (dated Feb. 5, 2016), 6 pgs.
"European Application No. EP10827580.1 Office Action_dated Apr. 13, 2017", (dated Apr. 13, 2017), 5 pgs.
"European Application No. EP11757037.4 European_Search_Report_dated Nov. 24, 2017", (dated Nov. 24, 2017), 9 pgs.
"European Application No. EP12739301.5 European_Search_Report_dated Nov. 24, 2017", (dated Nov. 24, 2017), 10 pgs.
"European Application No. EP13838707.1 European Search Report dated Jun. 10, 2016", (dated Jun. 10, 2016), 11 pgs.
"European Application No. EP15735446.5 European_Search_Report_dated Jul. 26, 2017", (dated Jul. 26, 2017), 9 pgs.
"European Application Serial No. EP14843579.5, Extended European Search Report dated Apr. 28, 2017", (dated Apr. 28, 2017), 2 pgs.
"Global Dossier Translation of 1st Office Action dated Apr. 24, 2017 for CN Application No. CN201480047295.6", (dated Apr. 24, 2017), 9 pgs.
"Global Dossier Translation of 1st Office Action dated Jan. 26, 2014 for CN Application No. CN201080046791.1", (dated Jan. 26, 2014), 10 pgs.
"Global Dossier Translation of 1st Office Action dated Jan. 26, 2014 for CN Application No. CN201080046880.6", (dated Jan. 26, 2014), 7 pgs.
"Global Dossier Translation of 1st Office Action dated Jul. 2, 2014 for CN Application No. CN201180022574.3", (dated Jul. 2, 2014), 5 pgs.
"Global Dossier Translation of 1st Office Action dated Mar. 2, 2016 for CN Application No. CN2013800546160", (dated Mar. 2, 2016), 9 pgs.
"Global Dossier Translation of 1st Office Action dated May 27, 2014 for CN Application No. CN201280007111.4", (dated May 27, 2014), 12 pgs.
"Global Dossier Translation of 1st Office Action dated Oct. 25, 2016 for CN Application No. CN201510072474.1", (dated Oct. 25, 2016), 4 pgs.
"Global Dossier Translation of 1st Office Action dated Oct. 9, 2016 for CN Application No. CN201510214363.X", (dated Oct. 9, 2016), 7 pgs.
"Global Dossier Translation of 2nd Office Action dated Aug. 19, 2014 for CN Application No. CN201080046791.1", (dated Aug. 19, 2014), 5 pgs.
"Global Dossier Translation of 2nd Office Action dated Dec. 12, 2016 for CN Application No. CN201510072474.1", (dated Dec. 12, 2016), 4 pgs.
"Global Dossier Translation of 2nd Office Action dated Dec. 17, 2014 for CN Application No. CN201280007111.4", (dated Dec. 17, 2014), 13 pgs.
"Global Dossier Transation of 2nd Office Action dated Feb. 9, 2015 for CN Application No. CN201180022574.3", (dated Feb. 9, 2015), 7 pgs.
"Global Dossier Translation of 2nd Office Action dated May 12, 2017 for CN Application No. CN201510214363.X", (dated May 12, 2017), 6 pgs.
"Global Dossier Translation of 2nd Office Action dated Nov. 30, 2016 for CN Application No. CN2013800546160", (dated Nov. 30, 2016), 10 pgs.
"Global Dossier Translation of 2nd Office Action dated Sep. 26, 2017 for CN Application No. CN201480047295.6", (dated Sep. 26, 2017), 7 pgs.
"Global Dossier Translation of 3rd Office Action dated Aug. 27, 2015 for CN Application No. CN201180022574.3", (dated Jun. 7, 2018), 8 pgs.
"Global Dossier Translation of 3rd Office Action dated Feb. 5, 2018 for CN Application No. CN201480047295.6", (dated Feb. 5, 2018), 6 pgs.
"Global Dossier Translation of 3rd Office Action dated Jun. 11, 2015 for CN Application No. CN201280007111.4", (dated Jun. 11, 2015), 5 pgs.
"Global Dossier Translation of 3rd Office Action dated Jun. 26, 2017 for CN Appilcation No. CN2013800546160", (dated Jun. 26, 2017), 4 pgs.
"Global Dossier Translation of 3rd Office Action dated Oct. 19, 2017 for CN Application No. CN201510214363.X", (dated Oct. 19, 2017), 8 pgs.
"Global Dossier Translation of 4th Office Action dated Apr. 18, 2016 for CN Application No. CN201180022574.3", (dated Apr. 18, 2016), 4 pgs.
"Global Dossier Translation of 4th Office Action dated Nov. 25, 2015 for CN Application No. CN201280007111.4", (dated Nov. 25, 2015), 4 pgs.
"Hazard of Harmonics and Neutral Overloads", American Power Conversion Legendary Reliability: White Paper#26, (2003), 8 pgs.
"Hazards of Harmonics and Neutral Overloads", White Paper#26 APC Legendary Reliability, (2003), 8 pgs.
"International Application Serial No. PCT/US2010/045467, International Preliminary Report on Patentability dated Feb. 14, 2012", (dated Feb. 14, 2012), 7 pgs.

(56) References Cited

OTHER PUBLICATIONS

"International Application Serial No. PCT/US2010/045467, International Search Report dated Oct. 7, 2010", (dated Oct. 7, 2010), 2 pgs.
"International Application Serial No. PCT/US2010/045467, International Search Report dated Feb. 17, 2011", (dated Feb. 17, 2011), 2 pgs.
"International Application Serial No. PCT/US2010/045467, Written Opinion dated Oct. 7, 2010", (dated Oct. 7, 2010), 6 pgs.
"International Application Serial No. PCT/US2010/045467, Written Opinion dated Feb. 14, 2012", (dated Feb. 14, 2012), 6 pgs.
"International Application Serial No. PCT/US2010/054506, International Preliminary Report on Patentability dated May 1, 2012", (dated May 1, 2012), 7 pgs.
"International Application Serial No. PCT/US2010/054506, International Search Report dated Dec. 28, 2010", (dated Dec. 28, 2010), 2 pgs.
"International Application Serial No. PCT/US2010/054506, International Search Report dated May 5, 2011", (dated May 5, 2018), 2 pgs.
"International Application Serial No. PCT/US2010/054506, Written Opinion dated Dec. 28, 2010", (dated Dec. 28, 2010), 6 pgs.
"International Application Serial No. PCT/US2010/054506, Written Opinion dated Apr. 28, 2012", (dated Apr. 28, 2012), 6 pgs.
"International Application Serial No. PCT/US2010/054869, International Preliminary Report on Patentability dated May 1, 2012", (dated May 1, 2012), 5 pgs.
"International Application Serial No. PCT/US2010/054869, International Search Report dated Jan. 12, 2011", (dated Jan. 12, 2011), 2 pgs.
"International Application Serial No. PCT/US2010/054869, International Search Report dated May 5, 2011", (dated May 5, 2011), 2 pgs.
"International Application Serial No. PCT/US2010/054869, International Written Opinion dated Jan. 12, 2011", (dated Jan. 12, 2011), 4 pgs.
"International Application Serial No. PCT/US2010/054869, Written Opinion dated Apr. 29, 2012", (dated Apr. 29, 2012), 4 pgs.
"International Application Serial No. PCT/US2011/028910, International Preliminary Report on Patentability dated Sep. 18, 2012", (dated Sep. 18, 2012), 5 pgs.
"International Application Serial No. PCT/US2011/028910, International Search Report dated May 26, 2011", (dated May 26, 2011), 2 pgs.
"International Application Serial No. PCT/US2011/028910, Written Opinion dated May 26, 2011", (dated May 26, 2011), 4 pgs.
"International Application Serial No. PCT/US2012/022370, International Preliminary Report on Patentability dated Jul. 30, 2013", (dated Jul. 30, 2013), 6 pgs.
"International Application Serial No. PCT/US2012/022370, International Search Report dated May 25, 2012", (dated May 25, 2018), 2 pgs.
"International Application Serial No. PCT/US2012/022370, Written Opinion dated May 25, 2012", (dated May 25, 2012), 5 pgs.
"International Application Serial No. PCT/US2013/060983, International Preliminary Report on Patentability dated Mar. 24, 2015", (dated Mar. 24, 2015), 7 pgs.
"International Application Serial No. PCT/US2013/060983, International Search Report dated Jan. 2, 2014", (dated Jan. 2, 2014), 3 pgs.
"International Application Serial No. PCT/US2013/060983, International Search Report dated Mar. 27, 2014", (dated Mar. 27, 2018), 3 pgs.
"International Application Serial No. PCT/US2013/060983, Written Opinion dated Jan. 2, 2014", (dated Jan. 2, 2014), 6 pgs.
"International Application Serial No. PCT/US2013/060983, Written Opinion dated Mar. 21, 2015", (dated Mar. 21, 2015), 6 pgs.
"International Application Serial No. PCT/US2013/078368 International Search Report dated Mar. 27, 2014", (dated Mar. 27, 2014), 3 pgs.
"International Application Serial No. PCT/US2013/078368, Written Opinion dated Mar. 27, 2014", (dated Mar. 27, 2014), 6 pgs.
"International Application Serial No. PCT/US2014/055106, International Search Report dated Dec. 18, 2014", (dated Dec. 18, 2014), 2 pgs.
"International Application Serial No. PCT/US2014/055106, Written Opinion dated Dec. 18, 2014", (dated Dec. 18, 2014), 3 pgs.
"International Application Serial No. PCT/US2015/010268, International Preliminary Report on Patentability dated Jul. 12, 2016", (dated Jul. 12, 2016), 5 pgs.
"International Application Serial No. PCT/US2015/010268, International Search Report dated May 1, 2015", (dated May 1, 2015), 2 pgs.
"International Application Serial No. PCT/US2015/010268, International Search Report dated Jul. 16, 2015", (dated Jul. 16, 2015), 2 pgs.
"International Application Serial No. PCT/US2015/010268, Written Opinion dated May 1, 2015", (dated May 1, 2015), 4 pgs.
"International Application Serial No. PCT/US2015/010268, Written Opinion dated Jul. 16, 2015", (dated Jul. 16, 2015), 4 pgs.
"International Application Serial No. PCT/US2016/040286, International Preliminary Report on Patentability dated Jan. 2, 2018", (dated Jan. 2, 2018), 7 pgs.
"International Application Serial No. PCT/US2016/040286, International Search Report dated Oct. 28, 2016", (dated Oct. 28, 2016), 4 pgs.
"International Application Serial No. PCT/US2016/040286, International Search Report dated Jan. 5, 2017", (dated Jan. 5, 2017), 4 pgs.
"International Application Serial No. PCT/US2016/040286, Written Opinion dated Oct. 28, 2016", (dated Oct. 28, 2016), 6 pgs.
"International Application Serial No. PCT/US2016/040286, Written Opinion dated Jan. 5, 2017", (dated Jan. 5, 2017), 6 pgs.
"International Application Serial No. PCT/US2016/049433, International Search Report dated Nov. 15, 2016", (dated Nov. 15, 2018), 2 pgs.
"International Application Serial No. PCT/US2016/049433, Written Opinion dated Nov. 15, 2016", (dated Nov. 15, 2016), 6 pgs.
"International Application Serial No. PCT/US2017/024679, International Preliminary Report on Patentability dated Oct. 11, 2018", 7 pgs.
"International Application Serial No. PCT/US2018/023535, International Search Report dated May 24, 2018", (dated May 24, 2018), 3 pgs.
"International Application Serial No. PCT/US2018/023535, Written Opinion dated May 24, 2018", (dated May 24, 2018), 7 pgs.
"Lighting for Layers", TAS Issue May 17, 2005, Technical Advice Sheet, (c)British United Turkeys Limited, (2005), 3 pgs.
"Machine Translation of 1st Office Action dated Aug. 9, 2016 for JP Application No. JP5195838", (dated Aug. 9, 2018), 3 pgs.
"Machine Translation of 1st Office Action dated Mar. 26, 2014 for JP Application No. JP2012524901", (dated Mar. 26, 2014), 2 pgs.
"Machine Translation of 1st Office Action dated Mar. 4, 2014 for JP Application No. JP2012524899", (dated Mar. 4, 2014), 3 pgs.
"Machine Translation of 1st Office Action dated Nov. 17, 2015 for JP Application No. JP2014261766", (dated Nov. 17, 2015), 4 pgs.
"Machine Translation of 2nd Office Action dated Dec. 19, 2014 for JP Application No. JP2012524901", (dated Dec. 19, 2014), 2 pgs.
"Natura 60", Big Dutchman The modern aviary for bard and free range egg production, (Apr. 2010), 3 pgs.
"Natura 70", Big Dutchman The modern aviary for bard and free range egg production, (Dec. 2010), 3 pgs.
"Sequential Linear LED Driver", Supertex inc. : DOC.# DSFP-CL8800, (2014), 7 pgs.
"TPS92411x Floating Switch for OfflineAC Linear Direct Drive of LEDs with Low Ripple Current", Texas Instruments: SLUSBQ6B, (Oct. 2013), 29 pgs.
Bowmaker, James K, et al., "Evolution of vertebrate visual pigments", Current Biology vol. 16 No. 13 R484, 6 pgs.
Bruininx, E.M A. M., et al., "A prolonged photoperiod improvesfeed intake and energy metabolism of weanling pigs", Journal of Animal Science 80, (2002), 1736-1745.

(56) References Cited

OTHER PUBLICATIONS

Cao, J., et al., "Green and Blue Monochromatic Lights Promote Growth and Development of Broilers Via Stimulating Testosterone Secretion and Myofiber Growth", J. Appl. Poult. Res., 17(2), (2008), 211-218.
Carroll, Joseph, et al., "Photopigment basis for dichromatic color vision in the horse", Journal of Vision 1, (2001), 80-87.
Chiao, Chuan-Chin, et al., "Spectral tuning of dichromats to natural scenes", Vision Research 40, (2000), 3257-3271.
Clarke, S, et al., "Energy Efficient Swine Lighting", Ontario Ministry of Agriculture Food and Rural Affairs, (Jan. 2006), 8 pgs.
Claus, R, et al., "Influence of light and photo periodicity on pig prolifcacy", J Reprod. Fert., Supple 33, (1985), 185-197.
Dartnall, H. J.A, et al., "Human Visual Pigments: Microspectrophotometric Results from the Eyes of Seven Persons", Proceedings of the Royal Society of London. Series B, Biological Sciences 220(1218), (Nov. 22, 1983), 115-130.
Davis, N. J, et al., "Preferencesof Growing Fowls for Different Light Intensities in Relation to Age, Strain and Behaviour", Animal Welfare 8(3), (199), 193-203.
Deaton, JW, et al., "Effect of Intermittent Light on Broilers Reared under Moderate Temperature Conditions", Poultry Science, vol. 57, No. 3, (May 1, 1978), 785-788.
El Halawani, M. E., et al., "Light Intensity Requirement for Breeder Hen Turkeys", Minnesota Turkey Gobbles, 66(4), (Jun. 2009), 3 pgs.
El Halawani, M. E., "Light spectrum and breeder hen turkeys egg production", Proeedings of the "Midwest Poultry Federation Convention", St. Paul., MN, (Oct. 2, 2007), 2 pgs.
Er, D., et al., "Effect of Monochromatic Light on the Egg Quality of Laying Hens", J. Appl. Poult, Res., 16(4), (2007), 605-612.
Gustafsson, G, et al., "Laying hens reactions on artificial light in a floor housing system", Agric Eng Int: CIGR Journal vol. 12, No. 2, (Jun. 2010), 21-30.
Halevy, O, et al., "Muscle development-Could environmental manipulations during embryogenesis of broiler schange it?", 7 pgs.
Ham, A. D., et al., "Colour preferences and colour vision in poultry chicks", Proc. R. Soc. B, 274(1621), (2007), 1941-1948.
Jacobs, Gerald H, "Evolution of colour vision in mammals", Philosophical Transactions of the Royal Society 364, (2009), 2957-2967.
Jacobs, Gerald H, et al., "Photopigment basis for dichromatic color vision in cows, goats, and sheep", Visual Neuroscience 15, (1998), 581-584.
Kennedy, Donald, et al., "Selective Light Absorption by the Lenses of Lower Vertebrates, and its Influence on Spectral Sensitivity", The Biological Laboratories, Harvard University; Marine Bioiological Laboratory; and U. S. Fish and Wildlife Service Laboratory, Woods Hole, Mass., (1956), 12 pgs.
Kuhlmann, Josef, "Aviary System Layer Aviary", Farmer Automatic GmbH & CoKG, 4 pgs.
Kuhlmann, Josef, "Combi System Combi Layer System", Farmer Automatic GmbH & CoKG, 4 pgs.
Kuhlmann, Josef, "Floor System Layer Floor System", Farmer Automatic GmbH & CoKG, 4 pgs.
Kuhlmann, Josef, "Multi DeckSystem Layer Cage", Farmer Automatic GmbH & CoKG, 4 pgs.

Manci, William E, et al., "Design and Performance of an Electronic Lighting-Control Circuit That Simulates Sunrise and Sunset", The Progressive Fish-Culturist 54, (1992), 127-129.
Neitz, Jay, et al., "Spectral sensitivity of cones in an ungulate", Visual Neuroscience 2, (1989), 97-100.
Olanrewaju, H A, et al., "A Review of Lighting Programs for Broiler Production", International Journal of Poultry Science 5 (4), (2006), 301-308.
Prayitno, D S, et al., "The Effects of Color and Intensity of Light on Behavior and Leg Disorders in Broiler Chickens", Poultry Science 76, (1997), 1674-1681.
Prayitno, D. S., et al., "The Effects of Color and Lighting on the Behavior and Production of Meat Chickens", Poultry Science, 7693), (1997), 452-457.
Prescott, N. B., etal., "Spectral sensitivity of the domestic fowl (Gallusg. domesticus)", British Poultry Science, 40(3), (1999), 332-339.
Rahimi, G., et al., "The Effect of Intermittent Lighting Schedule on Broiler Performance", International Journal of Poultry Science, 4(6), (2005), 396-398.
Rozenboim, I, et al., "New Monochromatic Light Source for Laying Hens", Poultry Science 77, (1998), 1695-1698.
Rozenboim, I., et al., "The effect of a green and blue monochromatic light combination on broiler growth and development", Poultry Science, 83(5), (2004), 842-845.
Rozenboim, I., et al., "The Effect of Monochromatic Light on Broiler Growth and Development", Poultry Science, 78(1), (1999), 135-138.
Taylor, Todd, "Great Green Hope: The Corporate Love Affair With Algae", Biomass Magazine, (Apr. 2010), 2 pgs.
Wilson. M., et al., "Impact Of Lighting Programs On Broiler Performance", Technical Focus, vol. 1, No. 1, (c) 2011 COBB South Affrica, (2011), 4 pgs.
Woodard, A E, et al., "Effect of Wave Length of Lighton Growth and reproduction in Japanese Quail", Oxford Journals.org, (Jun. 4, 1968), 6 pgs.
Yuhua, Xue, "Illumination and Benefit of Chicken Raising", New Countryside 2009 No. 3—No English Translation w/ Concise Statement of Relevance Under 37 CFR 1.98(a)(3)(i) For Citation of Non-English Language Document(s) from Related/Counterpart Foreign Application, (Mar. 31, 2009), 3 pgs.
"U.S. Appl. No. 14/906,685, Examiner Interview Summary dated Feb. 14, 2018", 3 pgs.
"U.S. Appl. No. 14/906,685, Notice of Allowance dated Mar. 9, 2018", 7 pgs.
"U.S. Appl. No. 14/906,685 Response filed Feb. 8, 2018 to Non-Final Office Action dated Nov. 9, 2017.pdf", 6 pgs.
"U.S. Appl. No. 15/108,690, Amendment & Response Under 37 CFR 1.114 filed Apr. 20, 2018", 6 pgs.
"U.S. Appl. No. 15/108,690, Notice of Allowance dated May 22, 2018", 5 pgs.
"International Application Serial No. PCT/US2015/046641, International Preliminary Report on Patentabililty dated Mar. 9, 2017.", 7 pgs.
"International Application Serial No. PCT/US2015/046641, Search Report Written Opinion dated Nov. 24, 2015.", 8 pgs.

\* cited by examiner

SYSTEM AND METHOD OF ILLUMINATING LIVESTOCK

CLAIM OF PRIORITY

This patent application claims the benefit of priority to U.S. Provisional Patent Application Ser. No. 62/314,692, filed Mar. 29, 2016, entitled "System and Method of Illuminating Livestock," which is hereby incorporated by reference herein in its entirety.

TECHNICAL FIELD

This document pertains generally, but not by way of limitation, to illuminating swine. More specifically this document relates to manipulating the psychological and physiological characteristics of swine through use of a lighting system.

BACKGROUND

The farming industry has greatly evolved over the past several decades, going from primarily outdoor based family farms to indoor corporate run facilities. For example, swine are typically kept in a barn environment where a plurality of pens are provided in side by side relation. Typically the flooring of the facilities are slated so that swine feces can be pushed between slats by the swine to a compartment below. In this manner the facilities house numerous swine indoors without access to the outside.

As a result, artificial lighting is a main source of lighting for the swine, whether incandescent, LED, high pressure sodium, compact fluorescent or the like. As scientist have studied animals, such as chickens, turkeys, swine, cows and the like under artificial light the scientist have come to understand not only how animals see light as compared to humans, but also the effects that characteristics of light have on different animals. In particular, scientist have recognized that photoperiod or the modulation of light to animals is important. Swine studies exist showing that swine raised under continuous darkness for 24 hours were less active than swine raised under a modulated 12 hours of dark and 12 hours of light. Meanwhile swine under 24 hours of light were most active, but also showed increased levels of stress and thus the pigs welfare was considered to be affected by the presence of continuous darkness or light.

Similarly, another characteristic of light shown to affect animals is the irradiance or intensity of light. For example, tests in swine show that piglets raised under 2-6 or even 10 lux do not gain as much weight as compared to 70-100 lux light whereas 2500 lux light showed weight loss. Meanwhile in another test on piglets 50 lux light gave improved health and improved immune status as compared to 10, 20 40 and 120 lux light. So again, intensity of light is another light characteristic known to affect animals and swine.

A final factor that affects animals, including swine is the spectrum or color of light. Tests on swine show that use of red wavelength light results in heavier bodyweight and increased daily gain compared to UV, cool white or even daylight. From studies swine appear to preferred dark over light, especially during sleep and dark light reduces aggressive behavior in swine. In addition tests currently show that pigs struggle to detect light sources above 600 nanometers (nm) and are thus not overly sensitive to red lights, compared to enhanced sensitivity in the blue light spectrum.

SUMMARY

The present inventors have recognized, among other things, that a need in the art exists for energy efficient lighting within swine facilities. In particular, swine facilities can contain 50, 100 or more lights depending on the size of the facility. Typically, these facilities contain 100-watt incandescent light bulbs that are a drain on energy and cause expensive power bills. In addition, because of the environment there is an abundance of feces, ammonium, mud, food pieces and the like within the barn. Thus, typically the 100-watt bulbs must be within a casing or jelly jar enclosure of some type to try to protect the lighting from the elements. In addition, wash downs expose the lighting to water, again requiring protection for the lighting to prevent breakage, shortage or worse fire conditions. Therefore, a principle object of the present invention is to provide cost effective lighting product for a swine facility. The present subject matter can help provide a solution to this problem, such as by manipulating characteristics of swine through use of a lighting system.

An aspect can include or use subject matter (such as an apparatus, a system, a device, a method, a means for performing acts, or a device readable medium including instructions that, when performed by the device, can cause the device to perform acts), such as can include illuminating livestock by using a plurality of lighting assemblies that are electrically connected to a dimming device. The lighting assemblies are dimmed from a white color that allows workers or others to see clearly within a livestock facility. The lighting assemblies are then dimmed from the white color to specific predetermined wavelength to result in a predetermined behavior of the livestock. In an example, the lighting assemblies are dimmed to a red colored light that is not detectable by the swine so that workers or people in the livestock facility can see, but the swine cannot see the light and believing that it is night time provide the predetermined response of sleeping or resting. In this manner the swine can receive additional dark time they desire during a time humans are using and working within a facility. In another example, the predetermined wavelength is a blue color that attracts the livestock to food to get them to eat at appropriate times. Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF SUMMARY OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
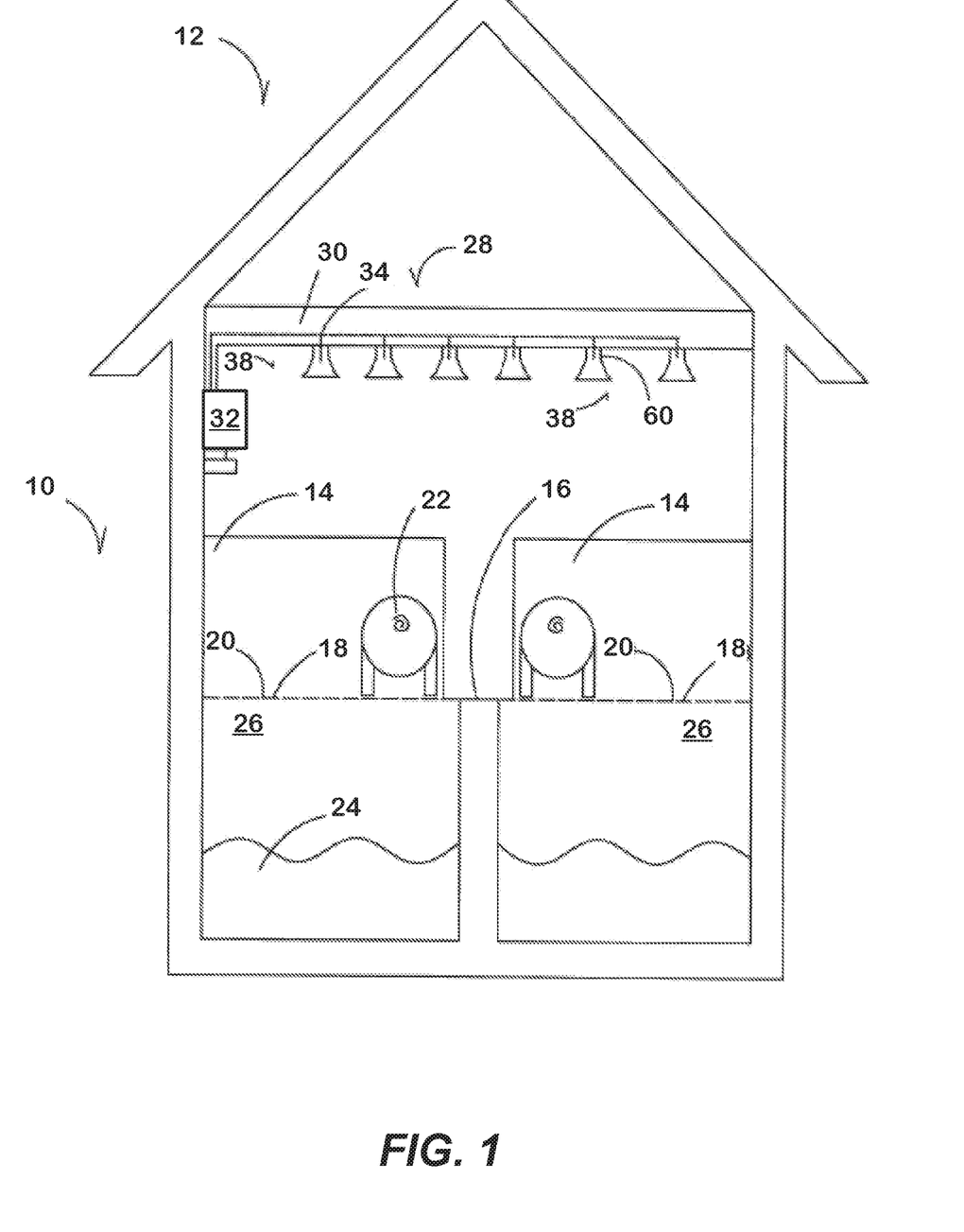
FIG. 1 is a cutaway side plan view of a dwelling for livestock.

The figures show a swine facility 10 that includes a dwelling 12 such as a barn or hog containment facility. The dwelling 12 has a plurality of containment units 14 such as pens, stalls and the like. The floor 16 of the containment units 14 consist of a plurality of slat elements 18 that sit in paralleled spaced relation to one another to form a plurality of openings 20 between consecutive slat elements 18. In one embodiment the slat elements 18 are angled or slanted with one end higher than the other to cause a downward slope toward an opening 20 in the floor 16. In this manner when a swine 22 steps on or rolls on feces 24 the feces 24 is pushed through the openings 20 below the floor 16. Similarly, during wash down of the containment units 16 the feces is power sprayed and the water and feces go through the openings 20 beneath the floor and into a reservoir 26.

The figures also show a lighting system 28 that in one embodiment includes a plurality of electrical conduit bodies 30 that receive and electrical input from an electrical source 32. The electrical conduit bodies 30 house wiring 34 that extend to provide an electric excitation signal to different areas in the dwelling. In one example, the wiring is electrically connected to a socket to receive a lighting assembly 38.

Figure 2:
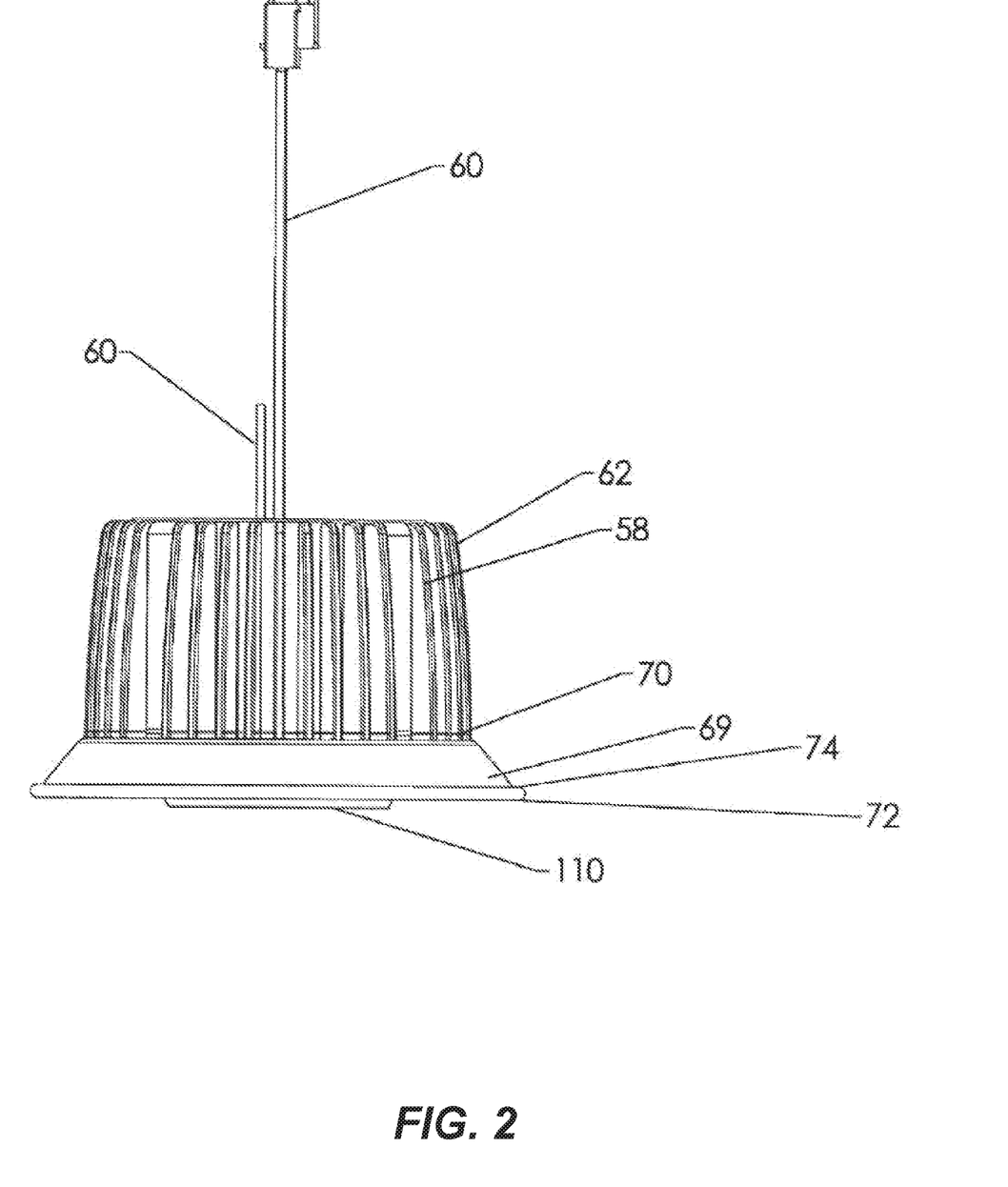
FIG. 2 is a side plan view of a lighting assembly for a dwelling for livestock.
Figure 3:
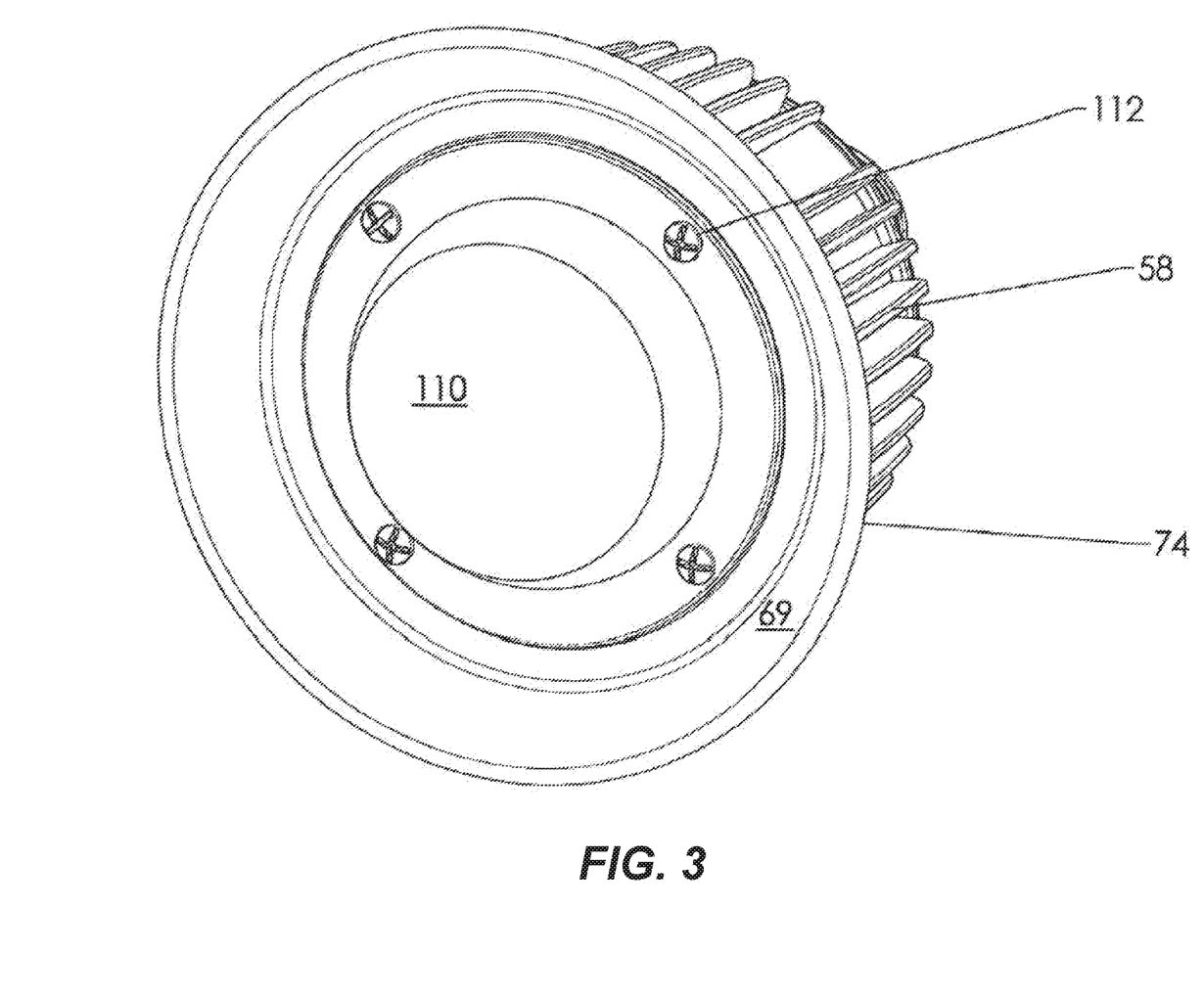
FIG. 3 is a side front perspective view of a lighting assembly for a dwelling for livestock.

The lighting assembly 38 includes a base 40 having electrical conducting elements 42 therein that threadably and electrically connects within the socket as is known in the art. The base 40 is either threadably received or compression fit onto a frustroconally shaped body 44 having a hollow interior and a sidewall 48 that extends outwardly and away from a first end 50 having a first diameter to a second end 52 having a second diameter greater than the first diameter. In this manner when waste or feces or water is sprayed on the body 44 the material flows downwardly and off the assembly 38. At the second end is a ring element 54 that is of size and shape to engage a sealing element 56 that in an example embodiment is made from an elastic material that expands upon compression. The sealing element 56 is secured between the ring element 54 and heat sink 58 to provide a water tight seal therebetween. In this manner electrical wiring 60 is electrically connected to the conductive body through the body 44 and heat sink within a water tight assembly 38.

In an alternative example, a socket is not presented and instead the wiring is directly provided. In this embodiment the body 44 with the base 40 are not provided and instead the electrical wiring 60 disposed through the heat sink is directly or hard wired to the wiring 34 of the conduit to provide a direct electrical connection. The heat sink is then threadably and/or sealing connected to the conduit again to provide a water tight seal to prevent water from being within the interior of the heat sink 58 and being exposed to the electrical wiring 60.

The heat sink 58 in an example embodiment is made of a plastic material and has a plurality of fin elements 62 that assist in conveying heat through the heat sink 58. The heat sink 58 extends from a first end 64 adjacent the conduit bodies 30 that receives the sealing element 56 in one embodiment and is sealed to a conduit body 30 in another to second end 66. The second end 66 is secured to a diffusion element 68 that has a frustroconical shape having a sidewall 69 that extends from a first end 70 outwardly and downwardly from the heat sink 58 to an open second end 72 having a diameter slightly greater than the diameter of the first end 70 and terminating in a lip element 74. By being sloped at an angle and downwardly, again, water, feces and other materials often known to swine facilities 10 flow off the diffusion element 68, yet the lip element 74 keeps a robust design to withstand the harsh environment.

Figure 4:
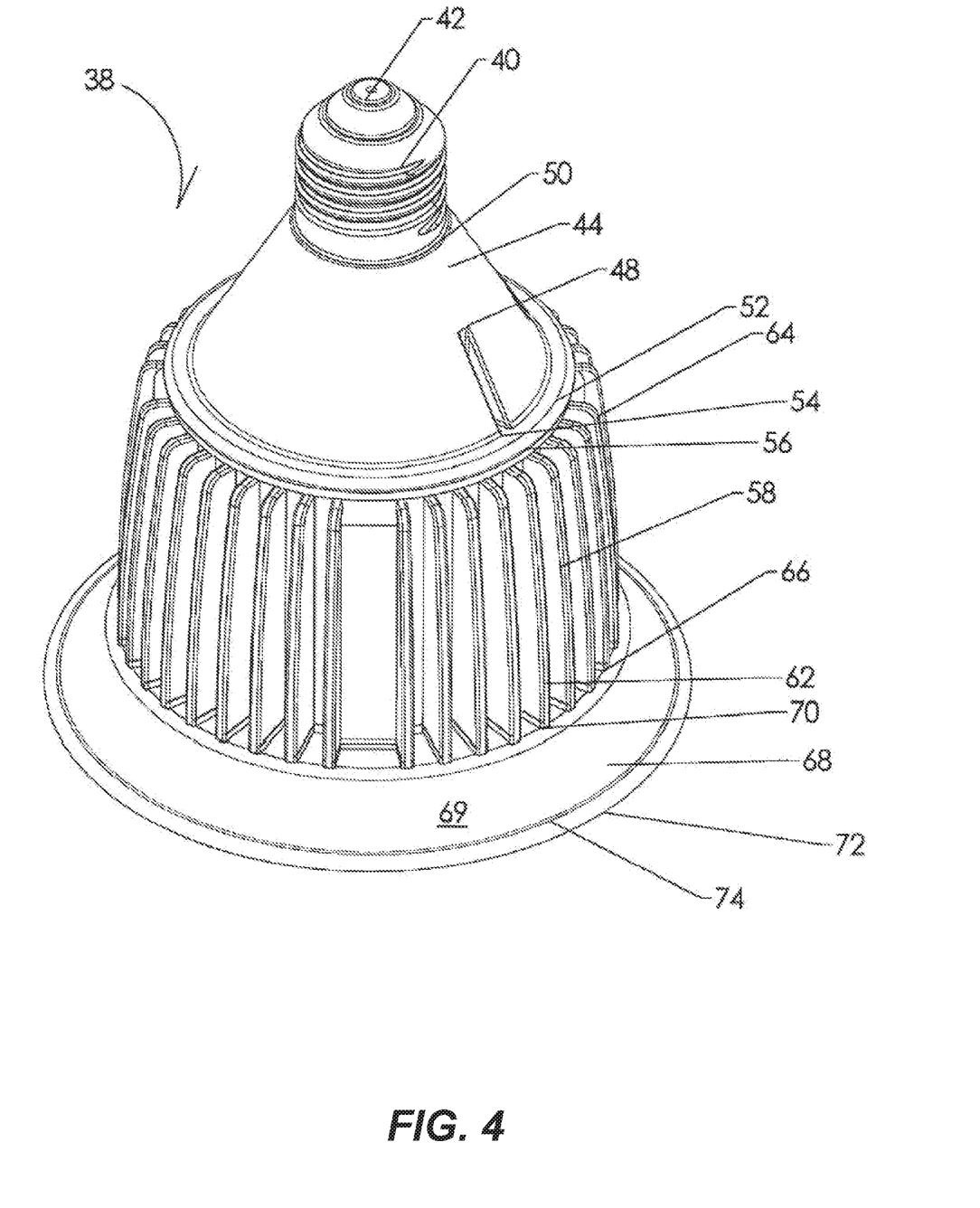
FIG. 4 is a top perspective view of a lighting assembly for a dwelling for livestock.

A substrate 76 is also secured to the second end 66 of the heat sink 58 and in one embodiment has a generally round shape. The substrate also in one embodiment is a printed circuit board. FIG. 4 shows the substrate 76 having driving circuitry 78. The circuitry is similar to that taught in U.S. Pat. No. 8,373,363 entitled "Reduction of Harmonic Distortion for LED Loads," to Z. Grajcar and issued on Feb. 12, 2013 and U.S. Pat. No. 8,643,308, entitled "Spectral Shift Control for Dimmable AC LED Lighting," to Z. Grajcar and issued on Feb. 4, 2014, the entire contents of each of which are incorporated herein by reference.

Figure 5:
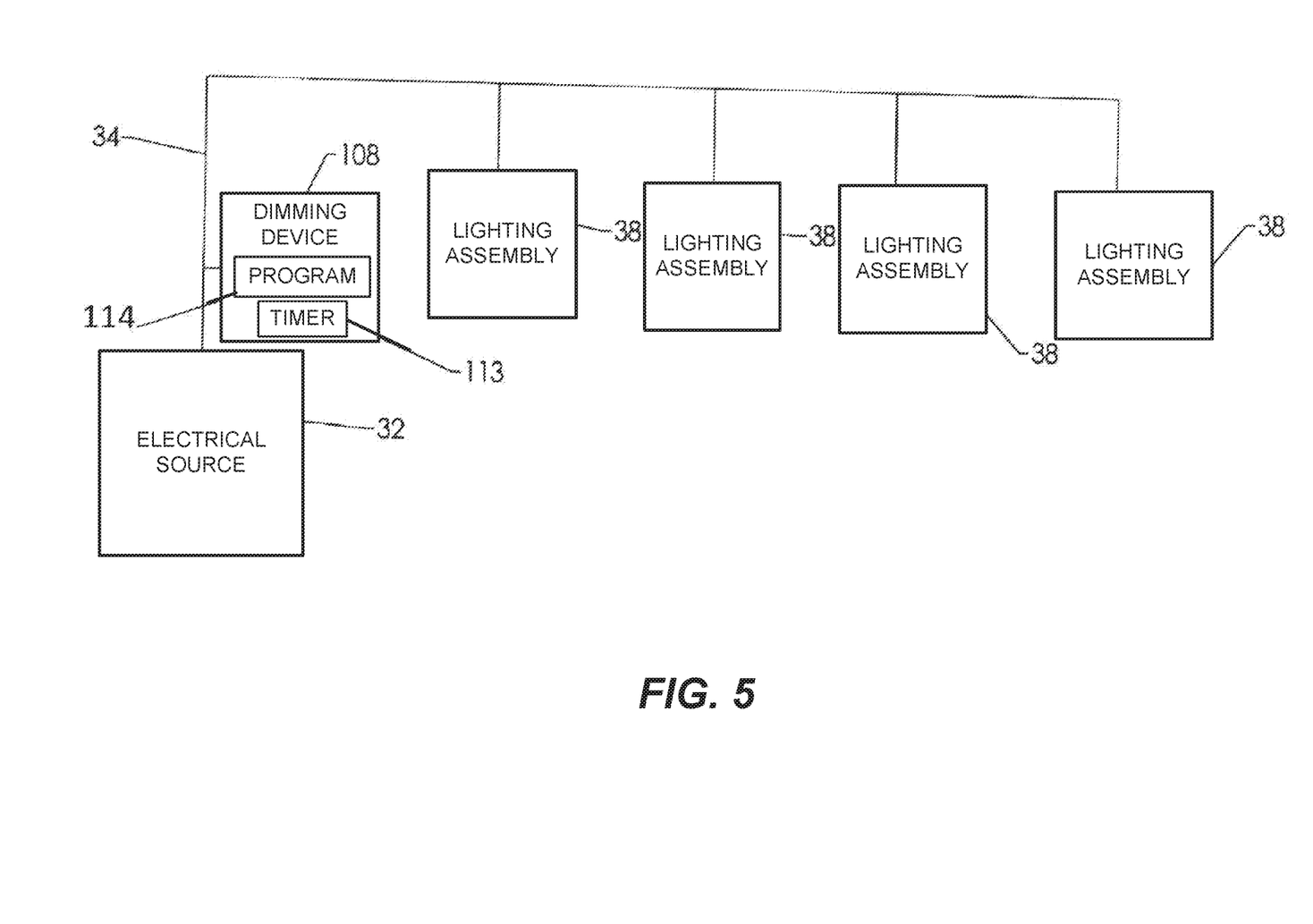
FIG. 5 is a schematic diagram of electric components for a lighting assembly for a dwelling for livestock.

The circuitry 78 of the present invention includes a rectifying device 80 that receives current from an AC source 82 and includes a first group of light emitting diodes 84 arranged in series with a second group of light emitting diodes 86, both of which comprise diodes emitting white light or a composite white light. A third group of light emitting diodes 88 comprising diodes emitting red light are presented in parallel to the first and second groups of diodes 84 and 86. Red light emitted is considered any light having a wavelength approximately between 620 nanometers (nm) and 780 nm. Alternatively light emitting diodes having providing blue light, or having a wavelength approximately between 400 nm and 500 nm could be used without falling outside the scope of this disclosure. The threshold voltage of the third group of light emitting diodes 88 in one embodiment is set lower than the threshold voltage of the first group of light emitting diodes 84 such that the third group of light emitting diodes 88 turn on first as voltage is increased.

A bypass path 90 is presented with a first impedance element 92, that in one embodiment is a transistor. In an example embodiment the first impedance element 92 is a depletion MOSFET, though a p-channel MOSFET, n-channel MOSFET or the like can be used without falling outside the scope of this disclosure, even if an additional transistor is required for functionality purposes. A first resistor 94 is also provided to control the flow of current through the first impedance element 92 to provide smooth and continuous current flow.

A current path 96 is also provided with a second impedance element 98 that similarly in one embodiment is a depletion MOSFET. Similar to the bypass path 90 the current path 96 utilizes a second resistor 100 again to control the impedance element 98. Similarly also, a current path 102 is provided between the third group of light emitting diodes 88 and first and second groups of light emitting diodes 84 and 86. Again, this current path 102 utilizes a third impedance element 104 and third resistor 106 to provide similar functionality as the other bypass paths. In particular, this third impedance element 104 acts as a switch to stop the flow of current through the third group of light emitting diodes 88 to eliminate the wavelength of light, such as red emitted by the third group of light emitting diodes 88.

When a dimming device 108 is electrically connected to the circuit and the voltage begins dropping, current flow to the second group of diodes 86 drops before the first group of light emitting diodes 84, dimming out a group of white diodes. Then as dimming continues and a threshold current is reached the first group of light emitting diodes 84 begin to dim. Thus, again white light is slowly dimmed and eliminated from the output light. In this manner only the third group of light emitting diodes 88 that are red remain providing light. A supplemental resistor 109 optionally is provided to limit current in the system and to improve efficiencies.

Therefore the assembly dims to produce a red light. Consequently, with a programmable dimming device the lighting assembly 38 can provide a combination of white and red light throughout a 24-hour period to optimize swine characteristics.

A lens element 110 is secured to the heat sink 58, diffusion element 68 or both. In one embodiment fastening elements 112 are utilized to provide the connection. In particular the lens element 110 is secured to provide a water tight seal so that water cannot encroach the interior of the assembly 38.

Figure 6:
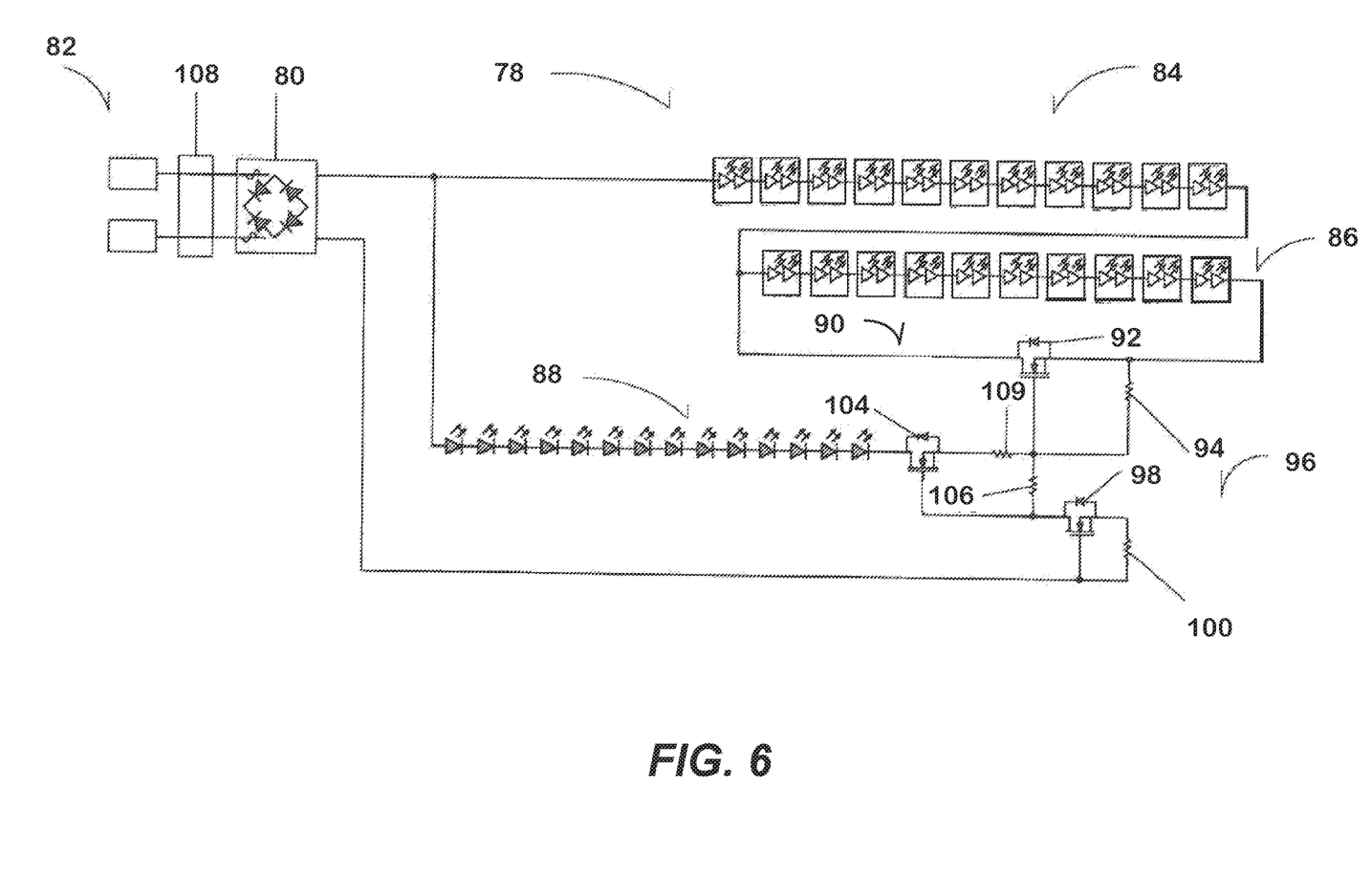
FIG. 6 is a schematic diagram of a lighting system for a dwelling for livestock.

In operation a plurality of light assemblies 38 are installed into a facility 10 and electrically connected to a dimming device 108 having a programmable timer 113. The assembly is connected within the facility 10 either directly or the body 44 can be attached to provide a retro fit if needed instead of a hard wire connection. In this manner the assembly 38 is modular in design.

The programmable timer 113 can then be programmed to provide maximum lighting during times when workers or humans are present in the barn. Because swine do not detect red wavelength light, the red component of the light assembly provides additional intensity and lumens making it easier for workers to see and lighting up the facilities 10. Meanwhile, because the swine do not detect this light there are no harmful effects on the swine. Then as the day goes on the white light emitting diodes are dimmed out to present red light. Because the swine cannot detect the light they perceive this time as dark, allowing them to sleep, rest and provide optimum weight gain and feed consumption. Meanwhile, if people still need to be within the facility a light source allowing them to see and work is still provided.

Alternatively, the programmable timer 113 can be adjusted so that more or less light is provided throughout a day to indicate to the swine that a particular season is provided. In this manner the behavior of the swine is manipulated enhancing farrowing, activity or other desired behavior. Thus, the lighting assembly 38 is used to manipulate both psychological and physiological characteristics of the swine to optimize growth, breeding and production of the swine. While presented in an example embodiment with red light emitting diodes, as indicated in the disclosure, blue light emitting diodes could similarly be used with the driving circuitry 78 and used to attract the swine to food or influence other swine behaviors without falling outside the scope of this disclosure.

In one embodiment the first group of light emitting diodes 84 is a first predetermined wavelength that in one embodiment is full spectrum white; the second group of light emitting diodes 86 is a second predetermined wavelength that in one embodiment is blue and in another embodiment UV or less than 400 nm; and the third group of light emitting diodes 88 is a third predetermined wavelength that in one embodiment is red. In this embodiment the a program 114 is either installed and into the dimming device 108 or programmed into the dimming device to be in communication with the timer 113 and dimming device to actuate the dimming device 108.

Figure 7:
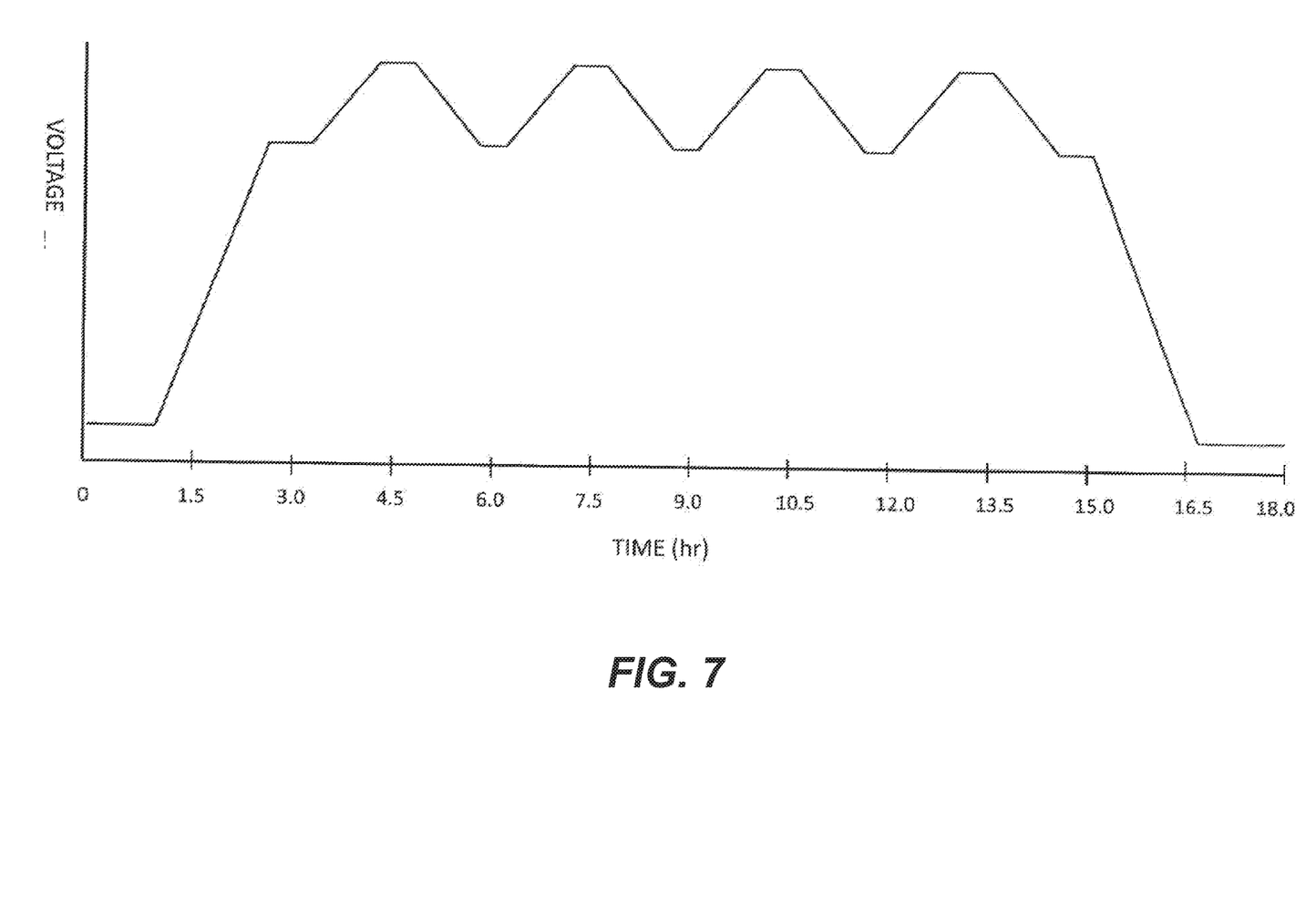
FIG. 7 is a graph showing voltage over time of a lighting system.

As provided in FIG. 7 the program 114 and thus the dimming device controls the input voltage and thus the intensity and spectrum output of the lighting assembly 38 to enhance growth and improve feeding or the circadian cycle of the swine. In particular during times when white light is not needed for workers, voltage is kept very low, such that only the predetermined threshold voltage of the third group of light emitting diodes 88 is reached, causing them to emit a low intensity monochromatic red light. The program then simulates a sun rise by slowly increasing intensity of the light over a sunrise predetermined period of time that in one embodiment is 2 hours and in another embodiment is greater than 10 minutes. During this period as the voltage increases to the threshold voltage of the first group of light emitting diodes 84 and current flows through the diodes 84. At this time current to the impedance element 104 to close that pathway and shut off the third group of light emitting diodes 88 so that only white or full spectrum light is provided that is appeasing to workers.

The program 114 continues to gradually increase intensity until the sunrise predetermined period of time is reached and then voltage is held constant and at a level where current flows through the bypass path 90 and does not flow to the second group of light emitting diodes 86 until a second, active predetermined period of time is reached. At this point the program 114 increases the voltage input of the dimmer such that a threshold voltage of the second set of light emitting diodes 86 is reached to allow current to flow to the second set of light emitting diodes 86 causing the UV or blue light to be emitted for a third or feeding predetermined amount of time that in one embodiment is 10 minutes and in another embodiment is less than 30 minutes.

Specifically, in an example the second group of light emitting diodes 86 emits a blue wavelength of light to attract the swine to its food. In another example, the light emitting diodes 86 are directional lights that are directed toward a food container such as a trough. In this example one determines the digestive cycle of the swine based on age, type or the like. Then based on the swine's digestive cycle the third predetermined amount of time is determined to have the swine eat for the optimum amount of time to ensure full eating has occurred, but to prevent over eating. Once the third predetermined amount of time is over the program actuates the dimming device 108 to reduce the voltage to cause the voltage to fall below the threshold voltage of the second group of light emitting diodes 86 causing current to flow back through the bypass path and causing the second group of light emitting diodes 86 to turn off, so again only the first group of light emitting diodes 84 emits light.

At this point again based on the digestive cycle of the swine an additional digesting predetermined period of time is determined that specifically is based on the amount of time for the swine to digest the food eaten. In an example, the fourth predetermined period of time is four hours, in another example the digesting predetermined period is over one hour. After the digesting predetermined period of time the program 114 again increases the voltage via the dimming device 113 such that the threshold voltage of the second group of light emitting diodes 86 is reached and the second group of light emitting diodes 86 to turn back on, emitting the blue light to attract the swine back to their food for an additional feeding predetermined period of time, again based on the swine's digestive system and is similar or the same amount of time as the third predetermined amount of time. This cycle of feeding and digesting predetermined periods of time continues until a sunset predetermined period of time.

At the onset of a sunset predetermined period of time the program 14 gradually decreases the voltage over the sunset predetermined period of time that is similarly and in one embodiment the same amount of time for the sunrise predetermined period of time. In an example, this is a two-hour period and in another example it is a period greater than ten minutes. As the voltage decreases the threshold voltage of the first group of light emitting diodes 84 is reached and the voltage falls underneath this threshold turning off the first group of light emitting diodes 84 and stopping current flow through this portion of the circuit. When current stops flowing through this portion of the circuit and the impedance element 104, the impedance element 104 allows the flow of current through the third group of light emitting diodes 88 such that monochromatic red light is provided. The dimming device 114 continues to decrease voltage until finally a nighttime level of intensity is reached that provides very low intensity monochromatic red light for a resting predetermined period of time. In one embodiment this is 16 hours in another embodiment this is greater than 8 hours. During this period the swine rests or sleeps while humans are still able to perform functions within the facility.

While in the example described the second group of light emitting diodes 86 emits blue wavelength light, in another embodiment UV radiation under 400 nm is emitted by the third group of light emitting diodes 88. Specifically, UV radiation suppresses melatonin within swine. Thus, instead of an individual determining the digestive system and cycles of the swine, the circadian cycle of the swine can be determined, and then based on the circadian cycle of the swine, instead of providing feeding predetermined periods of time, the program 114 provides melatonin suppression lighting during predetermined periods of time. Again, this period, in one example, is ten minutes, and in another example is less than thirty minutes. Then, instead of digesting predetermined periods of time, the amount of time it takes melatonin to begin being produced again after suppression is determined, or a melatonin reproduction predetermined period of time is provided. Then the program 114 again increases voltage to emit light from the third group of light emitting diodes 88 for another melatonin suppression predetermined period of time to regulate melatonin production of the swine and improve sleep of the swine. By regulating melatonin production and enhancing sleep regulation stress is reduce and swine growth is enhanced improving on the state of the art.

In addition, while example embodiments are described wherein the third group of light emitting diodes 88 are either a blue wavelength or emitting UV radiation, the light emitting diodes can have both lighting elements that emit blue wavelengths of light and UV radiation simultaneously. Alternatively an additional stage for an additional group of light emitting diodes is provided so that both blue wavelengths and UV radiation can be provided by the lighting device and controlled by the program 114 to enhance swine growth.

Thus, the groups of light emitting diode groups have first, second and third color characteristics respectfully. Each color characteristic can represent light having a spectrum substantially concentrated within a specified range of wavelength (e.g., 370-400 nm, 410-450 nm, 450-495 nm, or other narrow wavelength range) when over 90% or over 95% of the lighting energy emitted by the light source, plurality of lights, or group of lights is within the specified narrow range of wavelengths. In some examples, the light source may thus also emit a small amount of light (e.g., less than 10%, or less than 5% of lighting energy) outside of the specified range.

When wash down of the facilities 10 is required the assemblies 38 are sprayed with water from a power washer, hose or other water supply. The water then envelopes any dirt, dust, feces or other containments and the frustroconical sections of the assembly 38 allow for easy removal of the containments keeping the assembly 38 and facility clean and sanitary. Because of the water tight seals water does not enter the interior of the assembly 38 again ensuring long life of the assembly 38. Thus, at the very least, all of the stated objects have been met.

As one example, at the beginning of a lighting program a dimmer setting has the voltage provided to a lighting system with three groups of lights that act independently of one another and each having its own separate color characteristic. The lighting program begins with the dimmer set to meet a first threshold value where only the first group of lights emit light. The color characteristic of this first group is red. The program gradually increases the voltage provided to the first group with the dimming device. Once a second threshold voltage is reached after one hour, the first group of lights turns off and the second group of lights begin emitting light having a second color characteristic that is white light. The white light is emitted for two hours and then the controller again increases the voltage with the dimmer until a third threshold voltage is reached. At this time, with the second white group of lights still emitting light, a third group of lights begins emitting light with a third color characteristic, this time blue. The blue light gradually increases in intensity to a peak value within 2 minutes and then remains at full intensity for a period of 10 minutes before gradually decreasing in voltage until the voltage falls below the third threshold voltage and the third group of lights no longer emits light. During the emission of the blue light, the swine are attracted food causing feeding. The white light is then emitted for another two hours before the voltage again increases to provide the blue light for feeding. This cycle occurs four times. Then, after the final cycle the dimmer decreases the voltage until the first threshold voltage is reached and only red light is emitted.

In another example, at the beginning of a lighting program a dimmer setting has the voltage provided to a lighting system with three groups of a series of LED lights where each plurality or groups of LEDs act independently of one another and each having its own separate color characteristic. The lighting program begins with the dimmer set to meet a first threshold value where only the first group of LED lights emit light. The color characteristic of this first group is red. The program gradually increases the voltage provided to the first group with the dimming device. Once a second threshold voltage is reached after one hour, the first group of lights continue to emit light and the second group of lights begin emitting light having a second color characteristic that is white light. The white and red light combination is emitted for four hours and then the controller again increases the voltage with the dimmer until a third threshold voltage is reached. At this time, with the second white group of lights still emitting light, the first group of lights stops emitting light and a third group of lights begins emitting light with a third color characteristic, this time UV light. The UV light gradually increases in intensity to a peak value within five minutes and then remains at full intensity for a period of 30 minutes before gradually decreasing in voltage until the voltage falls below the third threshold voltage and the third group of lights no longer emits light and the red light again is emitted. This white and red light is emitted for another four hours before the voltage again increases to provide the UV light. This cycle occurs twice. Then, after the final cycle the dimmer decreases the voltage until the first threshold voltage is reached and only red light is emitted.

In yet another example, at the beginning of a lighting program has a dimmer setting the voltage provided to a lighting system with three groups of a series of LED lights where each plurality or groups of LEDs act independently of one another and each having its own separate color characteristic. The lighting program begins with the dimmer set to meet a first threshold value where only the first group of LED lights emit light. The color characteristic of this first group is red, a color not seen by the swine, but allowing workers to work. The program gradually increases the voltage provided to the first group with the dimming device. Once a second threshold voltage is reached after one hour, the first group of lights turn off and the second group of lights begin emitting light having a second color characteristic that is white light. The white light is emitted for four hours and then the controller again increases the voltage with the dimmer until a third threshold voltage is reached. At this time, with the second white group of lights stops emitting light, and a third group of lights begins emitting light with a third color characteristic, this time blue light. The blue light gradually increases in intensity to a peak value within five minutes and then remains at full intensity for a period of 15 minutes before gradually decreasing in voltage until the voltage falls below the third threshold voltage and the third group of lights no longer emits light and the white light again is emitted. This white light is emitted for another five hours before the voltage again increases to provide the blue light. Then, the dimmer decreases the voltage until the first threshold voltage is reached and only red light is emitted.

In one embodiment a control system for illuminating swine is provided with one or more controllers configured to increase voltage supplied to a first plurality of lights to a first threshold voltage to illuminate the first plurality of lights to provide a first light having a first color characteristic to swine. The one or more controllers are also configured to increase the voltage supplied to a second plurality of lights to a second threshold voltage to illuminate the second plurality of lights to provide a second light with a second color characteristic different than the first color characteristic. The one or more controllers are also configured to increase the voltage supplied to a third plurality of lights to a third threshold voltage to illuminate the third plurality of lights to provide third light with a third color characteristic that stimulates the swine to have a predetermined behavior.

In one embodiment, the third light is substantially concentrated within a specified range of wavelength between 400-495 nm. In another embodiment, the third light is substantially concentrated within a specified range of wavelength between 370-400 nm.

In one embodiment, the one or more controllers are configured to provide the third threshold voltage for a predetermined period of time. In another embodiment, the predetermined period of time is less than one hour.

In one embodiment, the predetermined behavior is eating of feed. In another embodiment, the predetermined behavior is the entrainment of a circadian cycle of the swine.

In one embodiment a method of stimulating a biological response in a swine is provided including supplying a first light from a lighting source having a first color characteristic on a swine for a first predetermined time. Next the first light is changed to a second light having a second color characteristic that promotes a predetermined biological response in the swine for a second predetermined period wherein the second predetermined period is less than the first predetermined period.

In another embodiment of the method, the second predetermined period is less than one hour. In yet another embodiment of the method the second light is substantially concentrated within a specified range of wavelength between 400-495 nm.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter. The scope of the invention should be determined with reference to the appended claims, along with the full scope of equivalents to which such claims are entitled.

What is claimed:

1. A method of stimulating a biological response in a swine, the method comprising:
   supplying a first light from a lighting source, the first light having a first color characteristic, on a swine for a first predetermined time; and
   changing the first light to a second light having a second color characteristic that promotes a predetermined biological response in the swine for a second predetermined period;
   wherein the second predetermined period is less than the first predetermined period.

2. The method of claim 1 wherein the second predetermined period is less than one hour.

3. The method of claim 1 wherein the second light is substantially concentrated within a specified range of wavelength between 400 nm and 495 nm.

4. The method of claim 1, further comprising, supplying a third light from a third lighting source with a third color characteristic that stimulates the swine to have a predetermined behavior.

5. The method of claim 4, wherein the third light is substantially concentrated within a specified range of wavelength between 370 nm and 400 nm.

6. The method of claim 1, wherein the second light is an ultraviolet (UV) light.

7. The method of claim 6, wherein the wavelength of the second light is less than 400 nm.

8. A method of stimulating a biological response in a swine comprising:

supplying a first light from a first source, the first light having a first color characteristic;

supplying a second light from a second source, the second light having a second color characteristic different from the first color characteristic; and supplying a third light from a third source, the third light having a third color characteristic different from both the first and second color characteristics;

wherein the third light includes a color characteristic that promotes a predetermined biological response in the swine; and wherein the first light and the second light are on when the third light is off.

9. The method of claim 8, wherein the first light is red.

10. The method of claim 8, wherein the second light is white.

11. The method of claim 8, wherein the third light is ultraviolet (UV).

12. The method of claim 8, wherein the first light is off when the second light and the third light are on.

* * * * *